Figure 1:
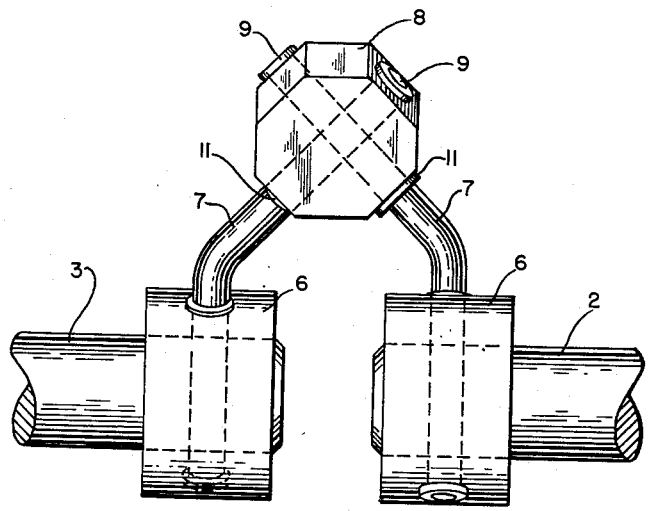

Dec. 19, 1961   W. V. MILLMAN   3,013,412
COUPLING DEVICE
Filed June 30, 1960

INVENTOR.
WILLIAM V. MILLMAN
BY

*Ralph B. Brick*
ATTORNEY

United States Patent Office 3,013,412
Patented Dec. 19, 1961

---

3,013,412
COUPLING DEVICE
William V. Millman, Moline, Ill., assignor to American Air Filter Company, Inc., Louisville, Ky., a corporation of Delaware
Filed June 30, 1960, Ser. No. 39,863
6 Claims. (Cl. 64—27)

The present invention relates to improved power transmission apparatus and more particularly to an improved coupling device to be employed between drive and driven shaft members.

In accordance with the present invention, an improved, interchangeable, rapidly assembled, coupling device is provided which requires no positive connection between the drive and driven shaft members, the device of the present invention insuring continuous maximum surface contact at the locale of power transmission regardless of occurring parallel and angular misalignment between the drive and driven shaft members. In addition, the coupling device of the present invention serves to accommodate both transverse and torsional bending through a pair of cooperating flexible members and serves to reduce impulse pounding between the coupled shafts.

Various other features of the present invention will become obvious to one skilled in the art upon reading the disclosure set forth hereinafter.

More particularly, the present invention provides a coupling device for closely spaced end-to-end drive and driven shaft members comprising a first arm member fixed to and extending from one of the shafts, a second arm member fixed to and extending from the other of the shafts, the arm members being positioned relative each other to permit free portions thereof to engage in abutting contact when the drive shaft is rotated, the arm members being relatively flexible with respect to each other and contoured to permit transverse and torsional bending of one with respect to the other whereby impulse pounding between the drive and driven members is absorbed by the contacting arm members.

It is to be understood that various changes can be made in the arrangement, form and construction of the apparatus disclosed herein without departing from the scope or spirit of the present invention.

Figure 2:
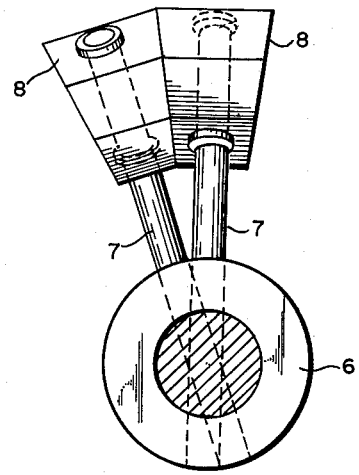

Referring to the drawing:

FIGURE 1 discloses a side elevational view of one embodiment of the coupling device of the present invention; and, FIGURE 2 discloses an end elevational view of the device of FIGURE 1.

As can be seen in FIGURE 1, drive shaft member 2 is closely spaced in end-to-end axial alignment with driven shaft member 3, the spaced ends of the shaft members each having a collar member 6 fixed thereto.

Arranged to extend through diametrically disposed apertures in each of collar members 6 and an aligned diametrically disposed aperture in the shaft upon which the collar member 6 is fixed is a flexible arm member 7. Arm members 7 advantageously can be made of flexible spring steel and are bent intermediate their ends to extend substantially in a plane including the longitudinal axes of the shafts at an approximately 45° angle to such longitudinal axes so that the free portion of one arm member crosses the free portion of the other arm member at an approximately 90° angle when the drive member 2 is rotated. It is to be noted that the portions of the arm member which pass through collars 6 and their respective shafts are fixed thereto by some suitable means such as welding so that the free ends of arm members 7 can bend in torsion as well as transversely to thus eliminate any impulse pounding which might occur between contacting arm members. Advantageously, this can be accomplished by welding each arm member to its collar at only the extreme end of the arm member opposite the free end. It also is to be noted that, since arm members 7 cross at an approximately 90° angle with respect to each other, an optimum of bending can occur before contact of such arm members is interrupted by slippage therebetween due to bending.

To provide an effective surface contact between arm members 7, each has rotatably mounted at its free end a wear resistant pad 8. Pads 8, as disclosed, can advantageously be of octagonal shape and can be made of a resilient, wear resistant, plastic material of self-lubricating properties, such as nylon. Each pad 8 is supported in rotatable position on its arm 7 between the peened end 9 of the arm and fixed sleeve 11 on the arm. It is to be noted that, since pads 8 can rotate freely on their arm members 7, full face contact between the pads is obtained at all times regardless of flexing or torsional bending. It also is to be noted (FIGURE 2) that pads 8 are of tapered contour so that the flat faced surfaces thereof fall in planes extending radially from the longitudinal axes of the shafts to which the supporting arm members of the pads are mounted thus to further insure that such full face contact of the pads is obtained at all times. Finally, it is to be noted that the arm members 7 and the pads 8 on each shaft are symmetrical, thus permitting rotation in either direction as well as free interchange between the drive and driven shaft members of the several parts of the device to facilitate assembly and reduce cost.

In a typical operation of the apparatus disclosed, for example in a situation where a one and a half horsepower internal combustion engine is used to drive a 500 watt generator, the shaft member of the engine is rotated and the pad 8 on the arm member 7 extending from the shaft of such engine engages the pad 8 on the arm member 7 extending from the shaft to the generator to cause such generator shaft to be rotated. The load impulses, which can be of substantially severe nature between such a generator and engine, are absorbed readily by the flexible and torsional bending arm members 7, the pads 8 remaining in full face contact regardless of angular or parallel misalignment of the drive and driven shafts. Once the operation is complete, the shafts then can be readily disassembled since there is no positive connection between the shafts. Further, upon re-assembling the coupling device, there is no need to be concerned with right and left parts of the coupling device since the parts are symmetrical and can be used on either shaft.

The invention claimed is:

1. A coupling device for closely spaced end-to-end drive and driven shaft members comprising a first arm member fixed to and extending from one of said shafts, a second arm member fixed to and extending from the other of said shafts, and pad members having flat faced surfaces mounted to the free portion of each of said arm members, said arm members being so positioned relative each other to permit said flat faced surfaces of said pad members to engage in abutting face contact when said drive shaft is rotated, at least one of said pad members being rotatably mounted relative its arm member to insure planar contact with the other of said pad members in the event of misalignment.

2. The apparatus of claim 1, said pads having a wear resistant surface of nylon.

3. A coupling device for closely spaced end-to-end drive and driven shaft members comprising a first arm member fixed to and extending from one of said shafts, a second arm member fixed to and extending from the other of said shafts, and pad members having flat faced surfaces mounted to the free portion of each of said arm members, said arm members being so positioned relative each other to permit said flat faced surfaces of said pad members to engage in abutting contact when said drive shaft is rotated, at least one of said pad members being rotatably mounted relative its arm member to insure planar contact with the other of said pad members in the event of misalignment, said arm members being of suitably flexible material and contour to permit transverse and torsional bending of one arm with respect to the other whereby any impulse pounding between drive and driven members is absorbed by the contacting arm members.

4. A coupling device for closely spaced end-to-end drive and driven shaft members comprising a first arm member fixed to and extending radially from one of said shafts, a second arm member fixed to and extending radially from the other of said shafts, and pad members having flat face surfaces mounted to the free portion of each of said arm members, said arm members being so positioned relative each other to permit said flat faced surfaces of said pad members to engage in abutting face contact when said drive shaft is rotated and said pad members being so contoured that each of said flat faced surfaces thereof falls in a plane extending radially from the shaft to which the supporting arm member for said pad is mounted.

5. A coupling device for closely spaced end-to-end drive and driven shaft members comprising a first flexible arm member fixed to and extending radially from one of said shafts, a second flexible arm member fixed to and extending radially from the other of said shafts, and pad members rotatably mounted on the free portions of said arm members, said pad members having flat faced surfaces and being contoured so that each of said flat faced surfaces thereof falls in a plane extending radially from the shaft to which the supporting arm member for said pad is mounted, each of said arm members extending from its shaft substantially in a plane including the longitudinal axis of said shaft at substantially a 45° angle to the longitudinal axis of said shaft to cross the other member at an approximately 90° angle to permit the pad members on said arms to engage in abutting face contact when said driven shaft is rotated.

6. The apparatus of claim 5, said first and second arm members and said pad members mounted thereon being respectively symmetrical to each other to permit rotation in either direction and interchange of parts.

References Cited in the file of this patent

UNITED STATES PATENTS

| | | |
|---|---|---|
| 2,263,987 | Finch | Nov. 25, 1941 |
| 2,570,776 | Dehmel | Oct. 9, 1951 |
| 2,892,327 | Kressin | June 30, 1959 |